United States Patent [19]
Filiopoulos et al.

[11] Patent Number: 5,958,229
[45] Date of Patent: Sep. 28, 1999

[54] ELECTROLYTIC DISINFECTANT SYSTEM

[75] Inventors: George Filiopoulos, Annapolis, Md.; Thomas E. Wenzel, Leesburg, Va.

[73] Assignee: The United States of America as represented by the Secretary of the Navy, Washington, D.C.

[21] Appl. No.: 09/048,794

[22] Filed: Mar. 27, 1998

Related U.S. Application Data

[60] Provisional application No. 60/041,948, Apr. 2, 1997.

[51] Int. Cl.$^6$ .................................................. B01D 19/00
[52] U.S. Cl. ......................... 210/206; 210/180; 210/218; 210/188; 210/192; 204/278
[58] Field of Search .................................... 210/143, 101, 210/188, 192, 198.1, 218, 180, 206, 756; 204/278

[56] References Cited

U.S. PATENT DOCUMENTS

| | | | |
|---|---|---|---|
| 3,291,708 | 12/1966 | Juda | 204/278 |
| 4,035,254 | 7/1977 | Gritzner | 204/278 |
| 5,094,734 | 3/1992 | Torrado | 210/198.1 |
| 5,688,385 | 11/1997 | Rhees et al. | 204/278 |

FOREIGN PATENT DOCUMENTS 155479   9/1985   European Pat. Off. .

OTHER PUBLICATIONS

Kirk–Othmer, "Encyclopedia of Chemical Technology" 3rd ed., vol. 12, p. 946, May 1981.

*Primary Examiner*—Jay H. Woo
*Assistant Examiner*—Frank Lawrence
*Attorney, Agent, or Firm*—John Forrest; Jacob Shuster

[57] ABSTRACT

An electrolytic disinfectant system especially useful in a maritime application for treating freshwater so as to render it potable, provides a brine solution that is stored in a tank from which hypochlorite as the disinfectant is fed to a freshwater supply. Gases also fed to the disinfectant storage tank including hydrogen is discharged therefrom and passed to a hydrogen recombiner through which the hydrogen is disposed of by reaction with oxygen under control of external heating bands to generate water vapor. The system thereby provides enhanced disinfectant effectiveness and eliminates storage of hazardous chemicals.

8 Claims, 6 Drawing Sheets

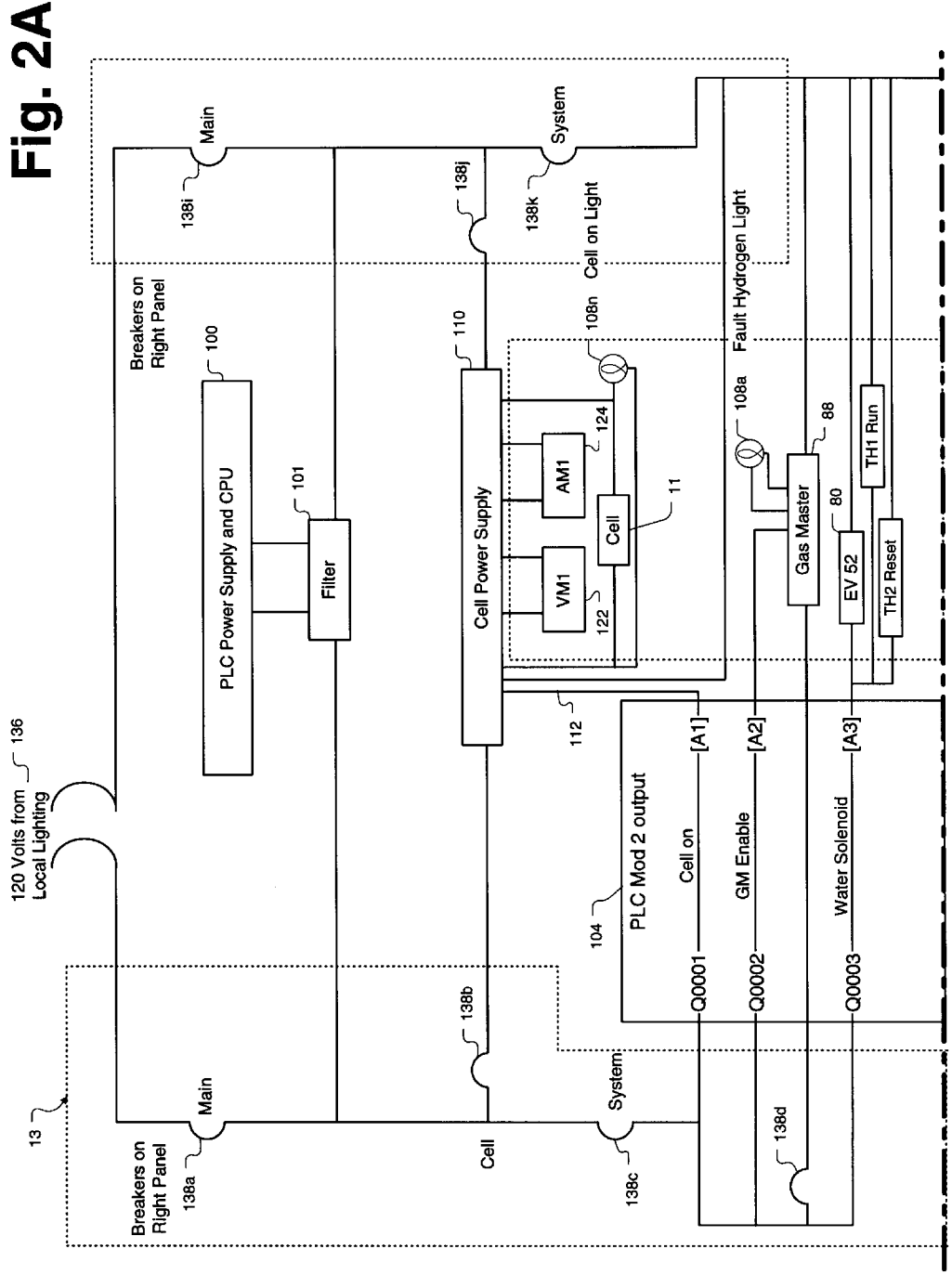

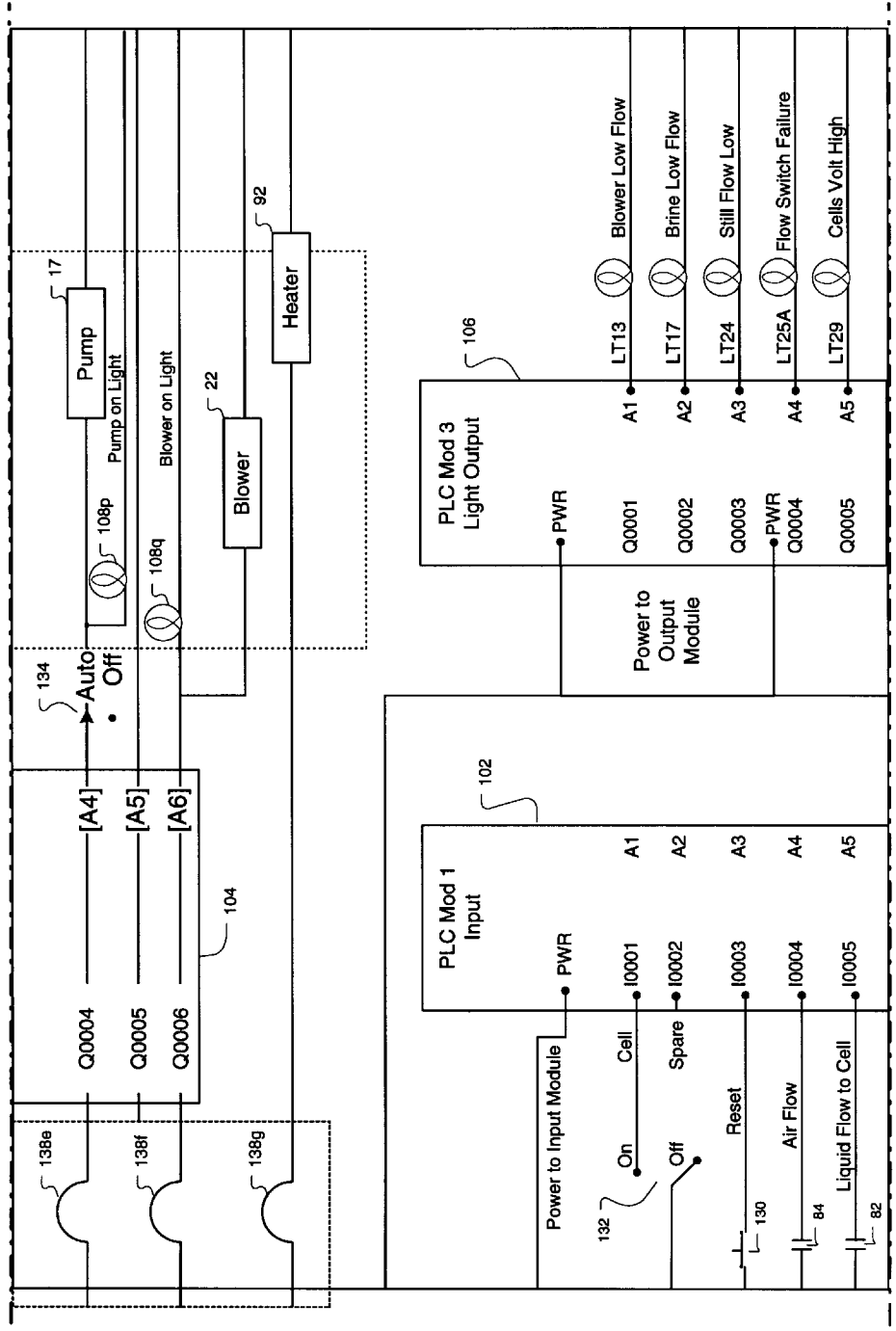

ELECTROLYTIC DISINFECTANT SYSTEM

The present application relates to electrolytic disinfection of freshwater by injection of hypochlorite to provide a supply of potable water, and is a division of a prior copending provisional application filed Apr. 2, 1997, Ser. No. 60/041,948, the benefit of which is being claimed herein.

BACKGROUND OF THE INVENTION

Currently, bromine cartridges are used for water disinfection on shipboard installations. The bromine cartridge system is expensive to operate, has low reliability and maintainability. It has been found to be impractical to so disinfect water under a wide range of conditions without producing a hazardous waste product.

Another system used for shipboard water disinfection is batch chlorination with calcium hypochlorite. The batch chlorination method presents numerous safety hazards since the calcium hypochlorite is corrosive, has a limited shelf life, and can cause injury to personnel or damage to equipment if handled incorrectly. It also presents the potential hazard of causing fires and explosions if it comes in contact with any organic combustible materials.

It would, therefore, be desirable to provide improved effectiveness of disinfection at reduced cost. It would also be desirable to couple this with the elimination of hazardous waste, as well as the elimination of handling and storage of hazardous chemicals.

SUMMARY OF THE INVENTION

A system is now provided for disinfecting water to provide a potable water supply, particularly in maritime application. Desirable efficiency and enhanced economy is thereby offered. The system can be operational with clean as well as contaminated or polluted water. Furthermore, it is easily adaptable for use within the electrical power system generally available on ships. According to certain aspects of the invention, salt and water are mixed within a briner tank to provide a brine electrolyte supplied to an electrolytic cell producing hypochlorite as a disinfectant and hydrogen collected in storage means for mixing with a freshwater supply and to generate water using hydrogen. According to other aspects of the invention, gaseous products from the disinfectant such as hydrogen-containing material is mixed with gaseous material containing oxygen to produce water by combining oxygen and hydrogen, thereby removing the gaseous hydrogen.

The foregoing referred to apparatus of the invention involves a method for disinfecting a supply of freshwater and providing a supply of potable water, particularly in maritime application, which method includes: electrolyte;

- maintaining a supply of hypochlorite as the disinfectant within storage means;
- mixing the hypochlorite from the hypochlorite storage means with the supply of freshwater; and
- reacting hydrogen from the storage means for safe disposal thereof by generating water.

Another aspect of the invention resides in a method for disinfecting a supply of freshwater with hypochlorite mixed therewith by pumping said hypochlorite to provide a pulsed flow thereof which passes through dampener for retarding the pulsed flow. Downstream of said dampener a back pressure to the flow of said hypochlorite to said freshwater is created by a pressure regulator.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein:

FIGS. 2a–2c comprise a block diagram of an embodiment of a system control unit according to the present invention.

DETAILED DESCRIPTION OF PREFERRED EMBODIMENTS

Figure 1:
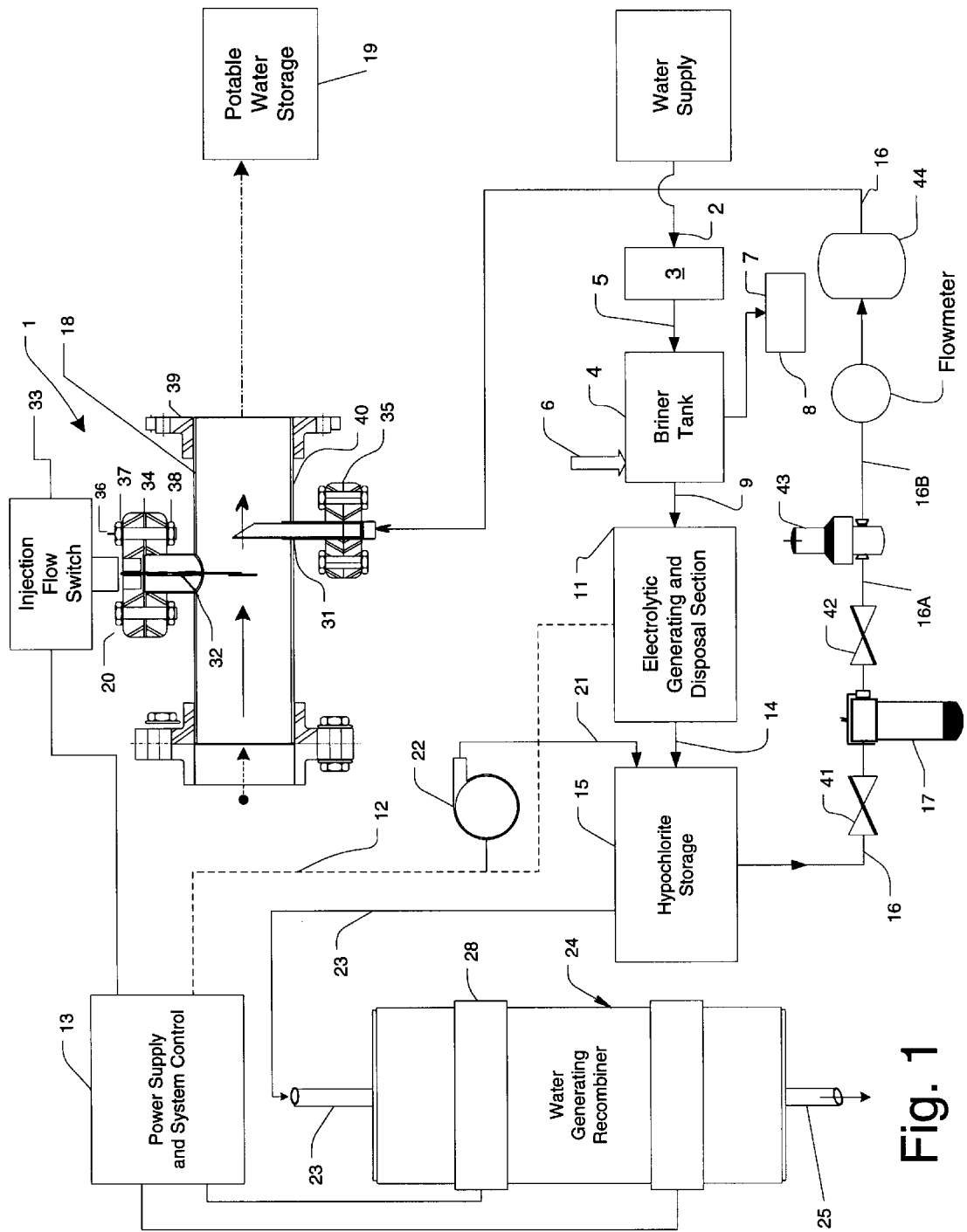
FIG. 1 is a partially sectional and schematic view of the disinfectant generating system of the present invention.

Referring now to FIG. 1, a disinfecting system 1 receives water, feeding through a water inlet line 2 from a source such water typically passes through a filter 3 for use during the generation of disinfectant received from a source other than the source of potable water being disinfected. This water may be freshwater, but if some source of potable water is available, this water is preferably potable water. The filter 3 can remove solids, e.g., sediment, that may be present in the water supply. Water from the filter 3 then passes to a briner tank 4 through a water inlet line 5.

The water feeding into the briner tank 4 may pass through at least one valve, not shown, in the inlet line 5 for controlling the flow and pressure to the briner tank 4. Also, salt is supplied to the briner tank 4, entering through a salt inlet 6, for dissolution in the briner tank. The salt for addition to the briner tank 4 will be sodium chloride, e.g., iodized table salt. However, it is to be understood that use of other salts is contemplated and these may include other chloride salts such as lithium chloride and potassium chloride. The salt will typically be added through the salt inlet in solid, e.g., particulate form, such as granular form. However, the salt may be initially, and at least partially, mixed with water and fed to the briner tank 4 as a highly concentrated liquid. That is, the tank 4 will accept salts in various states, e.g., a saturated saline salt suspension. The salt inlet 6 need be no more than a hatch or cap typically at the top of the briner tank 4, through which a granular solid can be poured into the tank 4, as it is preferable, particularly for use on board a ship, that the tank 4 not have an open, but rather have a closed, top. It is also usually an elongated, upright tank 4. Within the tank 4, any mixing of the salt with water may be assisted by agitating the tank contents. Where the system 1 is on board a ship, such agitation may occur merely by the usual vibration of the ship. Where sodium chloride is used, this salt will be so readily soluble in even unheated water, that agitation generally need not be used. The briner tank 4 is equipped with a disposal line 7 connecting to brine disposal means 8. Such brine disposal means 8, as for a representative shipboard installation, may be a tank typically constructed of a polymeric material, e.g., polyethylene. Brine can be disposed of by release through the line 7 to the tank 8. For an installation on board a ship, brine disposal from the briner tank 4 is useful when the system 1 is shut down, as when the ship is in port and supply of potable water is otherwise available.

Brine electrolyte is discharged from the briner tank 4 through an electrolyte line 9 feeding brine electrolyte to an electrolytic section 11 of the system. If the electrolyte from the briner tank 4 is concentrated, water feeding from a source, not shown, can be fed, such as into the electrolyte line 9, to provide for a more dilute electrolyte feed through the electrolytic generating and disposal section 11 of the system 1 within which hypochlorite is produced as the disinfectant. Such section 11 has a connection, shown by dashed connecting line 12, to a power supply and control unit 13 of the system 1. This system control unit 13 is discussed in more detail in the text accompanying FIGS. 2a–2c. In a batch operational mode, products from the electrolytic section 11 exits through a product discharge line 14 to a hypochlorite storage means 15. It is contemplated that for continuous operation a short length or coil of tubing could be used to store all of the hypochlorite that is necessary to assure continuous use.

The hypochlorite storage 15, which serves to store a supply of hypochlorite disinfectant, has a hypochlorite feed line 16 connecting through a feed line pump 17 to a hypochlorite injector 20 as representative mixing means feeding hypochlorite to a source of freshwater for disinfection. In FIG. 1, this water source is flowing through a water flow conduit 18 from a water source, not shown, to a potable water storage vessel 19. In addition to the products from the electrolytic section 11 entering the hypochlorite storage 15, a gaseous feed, usually filtered and typically just air, enters through a gas inlet line 21 to the hypochlorite storage 15. Usually, this gas will be forced, which can be forced air at ambient temperature, and can be coming from means such as a blower 22. The gas entering the hypochlorite storage 15 through the gas inlet line 21 will mix with gases, typically oxygen and hydrogen, coming from the electrolytic section 11. Gases in the hypochlorite storage 15 exit through a gas discharge line 23 to a water generating unit 24. This unit 24 may also be referred to herein as a hydrogen recombiner unit 24. Water vapor, usually entrained in air, will then exit the recombiner unit 24 through a water vapor exit line 25, usually to the ambient air.

With continued reference to FIG. 1, a hypochlorite injector unit 20 connects with a water flow conduit 18. Protruding into the water flow channel 40 within the unit 20 is a hypochlorite injection insert stem 31. Positioned across the water flow channel 40, and approximately at the positioning of the hypochlorite injection insert stem 31, is a water flow measuring arm 32. This measuring arm 32 connects with an injection flow switch 33 connected to the system control unit 13. The injector unit 20 utilizes various gaskets, including a flow switch gasket 34 and a hypochlorite line gasket 35. In addition to the gasketing, the flow switch 33 and injection insert stem 31 can be installed on the water flow channel 40 utilizing various bolts 36 that are present in association with washers 37 and nuts 38. The housing around the portion of the water flow channel 40 associated with the hypochlorite injector 20 may actually be a separate piece of conduit 18 sometimes referred to herein as the "spool", whereby the hypochlorite injector 20 may be referred to similarly herein as the "injection spool piece" or the like. Particularly where the hypochlorite injector 20 includes a spool that is used along with the water flow conduit 18, there can be used sleeves 39 which, in association with bolts, washers and nuts serve to secure the spool piece 20 with the water flow conduit 18.

The feed line pump 17 in the hypochlorite feed line 16 from the hypochlorite storage 15 can have a pump entry valve 41 and a pump exit valve 42, as diagrammed in FIG. 1. Downstream from the pump exit valve 42, there can be positioned in this first downstream portion of the hypochlorite feed line 16A a pulsation dampener means 43. Additionally, there can also be positioned in the second downstream portion of the hypochlorite feed line 16B, that is downstream from the pulsation dampener means 43, a back pressure regulator means 44. The balance of the hypochlorite feed line 16 from this back pressure regulator means 44 can connect directly with the hypochlorite injector insert stem 31.

The description of FIGS. 2 and 3 will be more particularly presented hereinbelow when the system control unit 13 and the routines executing in the system control unit 13 will be discussed together.

Referring again to FIG. 1, the gas discharge line 23 from storage 15 provides a conduit to the top of the water generating unit 24. This unit is typically a cylindrical unit 24 that is placed at least substantially upright. At the bottom of the water generating unit 24 is the water vapor exit line 25. Wrapped around the water generating unit 24, are bands 28. These are bands 28 of a band heater providing electrically generated heating by connection with the power supply and system control unit 13.

There will now be discussed a representative operation by referring again to FIG. 1. In this operation, the disinfecting system 1 receives water, which may be filtered as by passage through a filter, e.g., on the order of a 10 micron filter for removing particulate having a size larger than 10 microns, i.e., large solids. This intake water flows through the water inlet line 2 and then through the filter 3 as a second filter. This filter 3 can remove more finely divided solids, e.g., it may be on the order of an 0.4 micron filter. The water is thus filtered twice in this representative operation to remove particles or sediment. This water will generally be at a temperature within the range of from about 40° F. to about 120° F. It will also typically be at a pressure of from about 30 pounds per square inch gauge (psig) to about 120 psig. In this representative operation, intake water may be flowing in an amount of about 300 cubic centimeters per minute (cc/min). Intake water then flows through the tank water inlet line 5 to the briner tank 4. Also provided to the briner tank 4 is salt, usually in particulate form, e.g., granular, iodized table salt. Within the briner tank 4, salt and water mix, typically to prepare a concentrated brine solution. In this representative operation, 28 pounds of salt is added in batch operation to a tank 4 of 2.6 gallons capacity.

The water in the water inlet line 5 can pass through a valve, not shown, that controls the flow and pressure of water to the tank 4. Concentrated brine solution from the tank 4, as in an amount of 27 cc/min, can be mixed with additional filtered water, preferably potable water, as while the brine solution is feeding through the electrolyte line 9. The additional filtered water can be supplied in an amount of 270 cc/min, whereby a dilute brine electrolyte is fed into the electrolytic section 11. A flow switch, not shown, can be included with the briner tank 4 and provide for system shutdown in the event of low or no water flow to the briner tank 4. The system may also be equipped to provide for shutdown in the event of a low salt level in the briner tank 4. When required, brine may also flow through the briner tank to brine disposal means 8 through disposal line 7 which may contain a valve, e.g., a manually controlled valve.

Products from the electrolytic section 11, including hypochlorite solution and any gaseous products generated such as oxygen and hydrogen, are then passed through the product discharge line 14 into the hypochlorite storage 15 which may be a tank having a capacity on the order of 3–4 gallons or more. In the tank 15, the gas including the hydrogen rises to the top while typically filtered ambient air under a pressure of 1.4 psig is forced through the gas inlet line 21 by blower 22 for example, at a rate of 2.8 cubic feet per minute (cfm). This air dilutes the hydrogen present within the tank 15. The pressure of the gas entering through the gas inlet line 21 is also utilized in forcing the gas from the tank 15 through the gas discharge line 23.

Within the water generating unit 24, the small amount of hydrogen, which is a by-product of the electrolytic process carried out in section 11 of the system, and the oxygen in the air are combined to form water vapor. In a representative operation, the vapor exiting the unit 24 through the water vapor exit line 25 will contain less than one percent of hydrogen, by volume. Since the unit 24 operates most efficiently at elevated temperature and since the gases entering the unit 24 are typically not substantially above ambient temperature, heating of the unit 24 promotes efficient combination of hydrogen with oxygen. Thus, heating typically by means of the bands 28 that can be associated with a band heater will provide for a temperature within the recombiner generally about 100° C. However, internal temperatures for the unit 24 may be considerably more elevated, e.g., on the order of 300° C. to 400° C. Thus, in the representative operation, this unit 24 will be heated by the bands 28 to a temperature typically within the range from about 100° C. up to about 400° C. The water vapor from the recombiner unit 24 discharges through the water vapor exit line 25 and may be disposed of, e.g., simply vented to the surrounding atmosphere. In the event of a loss of gas flow through the gas inlet line 21, an interlock, not shown, can be used to shut down the electrolytic section 1 during this flow loss.

From the hypochlorite storage tank 15, liquid hypochlorite and brine solution is passed through the hypochlorite feed line 16. Such feeding of hypochlorite solution may be assisted by the pump means 17. The pump means 17 can be an injection pump 17 set to provide the required amount of hypochlorite solution to the water supply. In the representative operation, the injection pump 17 can be capable of pumping from about 30 to about 300 cc/min. From the pump means 17, hypochlorite solution continues through the hypochlorite feed line 16 to the water supply. The hypochlorite flowing at the end of the hypochlorite feed line 16 enters the hypochlorite injection insert stem 31 and through this is injected into the water flowing through the water flow conduit 18, from left to right as shown in FIG. 1. This water flow within the conduit 18 pushes against the water flow measuring arm 32. In the representative operation, this flow will be at least 45 gallons per minute (gpm). By connection through the injection flow switch 33, the amount of hypochlorite injected through the insert stem 31 is coordinated with the water flow within the conduit 18 to provide the desired amount of disinfectant, typically from about one part per million (ppm) up to about three parts per million, based on the amount of chlorine, as residual free chlorine, present in the disinfected water. In the event of a too low flow, or a loss of flow, of water through the conduit 18, a safety interlock, not shown, shuts off the feed line pump 17 and thus the feed of hypochlorite through the injection insert stem 31.

The hypochlorite solution feeding through the hypochlorite feed line 6 passes through a pump entry valve 41 and then on to the feed line pump 17. Hypochlorite solution exiting the feed line pump 17 passes into the pump exit valve 42 and then on through additional hypochlorite feed line 16A into a pulsation dampener means 43. From the pulsation dampener means 43, through the additional hypochlorite feed line 16B, the hypochlorite may proceed through a flow meter and enter a back pressure regulator means 44. From this back pressure regulator means 44, the hypochlorite proceeds through the last leg of the hypochlorite feed line 16 and into the hypochlorite injection insert stem 31 for entry into the water flow conduit 18.

For the feed line pump 17, a pump other than a diaphragm pump can be serviceable. Thus, a feed line pump 17 that is a gear pump, using polymeric or ceramic gears, could be employed. Where the pump utilized provides a steady flow of hypochlorite, there can then be eliminated the pulsation dampener means 43, and it is also contemplated to then eliminate the back pressure regulator means 44.

It is preferred, however, for best efficiency of operation, that there be used in the hypochlorite feed line 16 a diaphragm pump 17. Such type of injection pump has an oscillating diaphragm that provides a pulsating flow to the hypochlorite solution exiting the pump 17 through the pump exit valve 42. It is also preferred for efficient operation that these pump entry and exit valves 41, 42 be check valves. To mitigate the pulsating flow of hypochlorite solution, hypochlorite flow through the exit valve 42 then proceeds into the pulsation dampener means 43. The pulsation dampener means 43 will typically contain an air pocket which contracts and expands according to the applied pressure and thereby desirably reduces the pulsation, or surge, of the hypochlorite solution emerging in pulsing flow from such a diaphragm pump 17.

In the representative operation, this pump 17 will pump hypochlorite solution through the feed line 16 at a rate of from about 30 up to about 300 cubic centimeters per minute (cc/min). In such process, this pump 17 will operate at a pressure within the range from about 25 psig up to about 60 psig. Below about 25 psig, the exit check valve 42 may unseat and maintain itself in free floating operation, rather than reseating to provide normal pump operation to overcome this unseating and floating, there is provided the back pressure regulator 44. This provides an elevated back pressure which overcomes the flotation of the pump exit check valve 42 and thereby leads to normal operation of this valve 42. With the back pressure regulator 44, hypochlorite disinfectant solution in the representative operation is discharged to the hypochlorite injection insert stem 31 at a continuous pressure, typically up to, or at about, 60 psig.

The various inlet lines, discharge lines, feed lines and disposal lines are provided by any means useful for conveying liquids or gases. Generally, these lines are conduits of simply tubing that is made of a polymeric material, e.g., high density polyethylene tubing. However, other polymeric materials, such as polypropylene or polytetrafluoroethylene, would be serviceable. also, it is contemplated to use other than polymeric tubing, such as metal piping for water supply lines. It is, however, advantageous that all lines be provided from the same polymeric material. It is also advantageous to utilize flexible polymeric tubing for all of the liquid and gas flow lines for ease of connecting the major elements of the disinfecting system 1.

For some installations, such as shipboard installations, it may be advantageous, as for space considerations, to totally house the disinfecting system 1, from the water inlet line 2 up to the hypochlorite injector 20, within an enclosed housing unit. Such a housing unit could contain the major elements of the disinfecting system and provide a completely closed casing around all these elements. Associated with the housing unit could be a separate housing for the system control unit 13. Where a housing unit is used for the disinfecting system 1, it can be equipped with various inlets and outlets, e.g., the water inlet line 2 and the hypochlorite feed line 16, but otherwise be totally encased. In some installations where shock and vibration may be encountered, the housing unit enclosing the disinfecting system 1 can be an inner housing. This can be encased in a larger housing structure, and the inner housing unit can be flexibly supported, e.g., spring supported, to the outer housing structure to provide additional shock and vibration resistance for the disinfecting system 1.

In general, it is contemplated that the disinfecting system 1 will be most serviceably operable at a system pressure within the range from ambient pressure, i.e., zero pounds per square inch (psi), up to a pressure of about 60 psi. Operation below atmospheric pressure is not contemplated, for economy, and operating pressure above about 60 psi will typically require structural reinforcement in lines and major elements which can be uneconomical. It is also contemplated that the disinfecting system 1 will usually be operated at a temperature within the range from about 40° F. to about 120° F. Typical freshwater sources will be supplying freshwater at a temperature of at least about 40° F, but not above about 120° F, which may be deleterious by shortening component operating life.

The hydrogen recombiner unit 24 is most serviceably a commercially available catalytic unit capable of combining hydrogen and oxygen into water, which will typically be water in vapor form. Usually such recombiner unit 24 will operate at elevated temperature, e.g., on the order of about 120° F.–140° F. or higher. Particularly in systems where the disinfecting unit 1 is enclosed within a housing, the recombiner unit 24 can be insulated from the balance of the other major elements of the system in the housing. Moreover, water vapor product may be discharged to the ambient air outside the housing. This unit 24, such as provided by a commercially available product, can include a catalyst, e.g., a palladium catalyst, usually deposited on a support, or substrate material. Suitable substrate materials include ceramic materials such as aluminum oxide, and these are often configured in the manner of a network, such as a honeycomb.

Figure 2C:
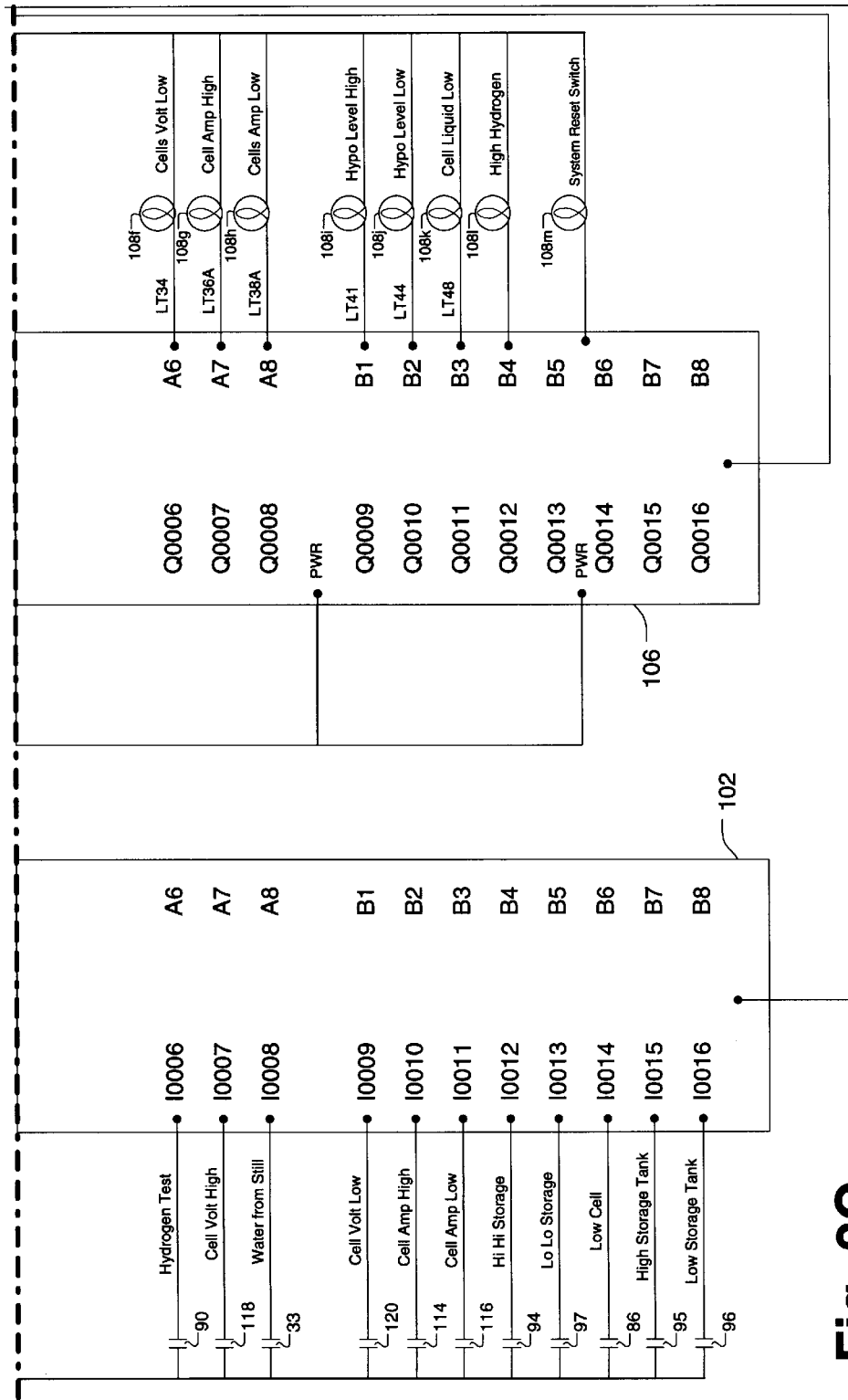

Referring now to FIGS. 2a–2c, an embodiment of the system control unit 13 according to the present invention is shown. The system control unit 13 comprises various devices all connected in circuit communication as shown in FIGS. 2a–2c. The term "in circuit communication" as used herein is used to describe (I) devices that are directly or indirectly electrically connected with each other, (ii) devices having other devices or combinations of devices (e.g., analog-to-digital converters, digital-to-analog converters, sensors, resistors, transistors, breakers, amplifiers, relays, buffers, drivers, transmitters, receivers, and decoders) between them, (iii) devices in optical communication with each other (via, e.g., an optoisolator or fiber optic link), (iv) devices in electromagnetic communication with each other (via, e.g., radio frequency transmitter and receiver pair), (v) devices connected by and through other structures allowing them to communicate with each other, and (vi) any combination of any of the above.

Various items mentioned hereinabove were not shown in FIG. 1. Some of these devices are in circuit communication with the system control unit 13 and are represented schematically in FIGS. 2a–2c. For example, as mentioned above, the water flowing in through the water inlet line 5 can pass through a valve that controls the flow and pressure of water to the briner tank 4; this valve can be a solenoid valve 80 positioned in the stream of fluid between the filter 3 and the briner tank 4. One suitable solenoid valve 80 is available as model number 2209 DGM from Peter-Paul, New Britain, Connecticut. Also, as mentioned above, a flow switch can be included between filter 3 and briner tank 4 to provide for system shutdown in the event of low or no water flow; this flow switch can be a water inlet flow switch 82 positioned in the stream of fluid between the filter 3 (or solenoid valve 80) and briner tank 4. The water inlet flow switch 82 is in circuit communication with the system control unit 13 and opens when insufficient inlet water flow is detected. One suitable water inlet flow switch 82 is available as model number Chemtec LPOH375 (200cc) SCNO from Hanmer & Noyer, Cleveland, Ohio 44140. In addition, as mentioned above, a heater 92 can be associated with the hydrogen recombiner unit 24 to provide the temperature needed for the catalyst therein to produce water from the hydrogen and oxygen gases present. One suitable heater 92 is a band heater available as model number STB442A1-E19 from Watlow Electric Mfg. Co., St. Louis, Mo. Also, as discussed above, a cell level switch 86 senses whether the electrolytic section 11 is filled with brine. The level switch 86 is in circuit communication with the system control unit 13 and opens when an insufficient volume of fluid in section 11 is detected. One suitable level switch 86 is available as model number 627-NHXU 1.75 from Hanmer & Noyer, Cleveland, Ohio 44140.

Various items not mentioned hereinabove and not shown in FIG. 1 are in circuit communication with the system control unit 13 and are represented schematically in FIGS. 2a–2c. For example, flow from the blower 22 is monitored by a blower flow switch 84 positioned in the stream of fluid between the blower 22 and the hypochlorite storage tank 15. The blower flow switch 84 is in circuit communication with the system control unit 13 and opens when an insufficient volume of air is flowing therethrough. One suitable blower flow switch 84 is available as model number Chemtec 500-316-BP-2 from Hanmer & Noyer, Cleveland, Ohio 44140. Additionally, an optional hydrogen gas monitor 88 can be used to sense the presence of hydrogen in the fluid exiting the hydrogen recombiner unit 24 and is positioned in the stream of fluid between through hydrogen recombiner unit 24 and the water vapor exit line 25. The hydrogen gas monitor 88 preferably includes a sensor switch 90 that is in circuit communication with the power supply and control unit 13 and opens when the level of hydrogen gas detected exceeds a particular threshold. One suitable hydrogen gas monitor 88 is available as model number 73HT (CEA Instruments) from Global Technology, pearl River, N.Y. 10965.

Finally, the level of hypochlorite in the hypochlorite storage tank 15 is measured by four level switches: a hypo storage high-high switch 94, a hypo storage high switch 95, a hypo storage low switch 96, and a hypo storage low-low switch 97, all of which are in circuit communication with the PLC CPU module 100 via the PLC input module 102. the hypo storage high-high switch 94 is used to prevent the hypochlorite from spilling out the top of the tank 15 and opens if the level of hypochlorite in the tank 15 rises above a predetermined point, about 9 inches below the top of the tank 15. The hypo storage high switch 95 is used to turn off the electrolytic section 11 when the tank 15 fills to a certain point and opens if the level of hypochlorite in the rank 15 rises above a predetermined point, about 12 inches below the top of the tank 15. The hypo storage low switch 96 is used to turn the section 11 back on when the tank has been drained to a particular level and closes if the level of hypochlorite in the tank 15 falls below a predetermined point, about 17 inches below the top of the tank 15. The hypo storage low-low switch 97 is used to protect the pump 17 and also to detect a catastrophic leak in the tank or piping and opens if the level of hypochlorite in the tank 15 falls below a predetermined point, about 20.5 inches below the top of the tank 15. The switches 94–97 are available as model numbers -999-046-HNX 4 from Hanmer & Noyer, Cleveland, Ohio 44140.

Several of the devices mentioned hereinabove and shown in FIG. 1 are in circuit communication with the system control unit 13 and are represented schematically in FIGS. 2a–2c. For example, the electrolytic section 11, blower 22, and injection pump 17 are all in circuit communication with the system control unit 13 as shown in FIGS. 2a–2b.

The system control unit 13 comprises a programmable logic controller (PLC) central processing unit (CPU) module 100 having an integral PLC power supply. The power supplied to the PLC CPU module 100 can be filtered by an optional electromagnetic interference filter 101. The PLC CPU module 100 includes a digital electronic device that is programmed to implement various functions used in controlling the EDG, as discussed in more detail in the text accompanying FIGS. 3a–3b. The PLC CPU module 100 is in circuit communication with a PLC input module 102, a PLC control output module 104, and a PLC light output module 106 via an input/output (I/O) chassis (not shown) having a plurality of I/O module slots (not shown), as is known in the art. The PLC CPU module 100 detects various aspects of the system 1 based on inputs form the PLC input module 102, various aspects of the system 1 using the PLC control output module 104, and lights various indicator lamps 108a–108m using the PLC light output module 106. As can be seen in FIGS. 2a–2b, additional lamps 108n–108q are connected in series or parallel circuit relationship with various other components to provide indications relative to those components.

The system control unit 13 also comprises a cell power supply 110 in circuit communication with the electrolytic section 11 and with the PLC CPU module 100 via the PLC control output module 104 and that selectively provides electrical power to the electrolytic section 11 to generate hypochlorite.

Additionally, the cell power supply 110 is controlled by a control line 112 from the PLC CPU module 100 via the PLC control output module 104 to selectively provide power to the electrolytic section 11 in response to the PLC CPU module 100. The power supply 110 also has internal circuitry (not shown) to measure the voltage and current being generated. The power supply 110 measures both current and voltage for both upper and lower limits and opens appropriate control switches when an out of tolerance condition is detected; high ampere switch 114, a low ampere switch 116, a high voltage switch 118, and a low voltage switch 120. The amp high switch 114 opens when the amperage supplied section 4 exceeds 20–21 amperes. The low switch 116 opens when the amperage supplied falls below 16–17 amperes. The high volt switch 118 opens when the voltage exceeds 33–35 volts. The low volt switch 120 opens when the voltage exceeds 20–22 volts. One suitable power supply 110 is available as model number SPS-3981 Rev. A from Transistor Devices, Inc., Cedar Knolls, New Jersey 07927-2003.

To redundantly ensure that the power supply 110 operates within the required amperage and voltage parameters, an optional separate voltmeter 122 and an optional separate ammeter 124 are provided. In addition to providing a visual indication (by, e.g., a dial or digital display, not shown) of the voltage across and amperage passing through section 11, the voltmeter 122 and ammeter 124 include four switches (not shown) that function like the switches 114, 116, 118, and 120 of the power supply 110, described above. These four switches (not shown) are connected in series circuit relationship with the switches 114, 116, 118, and 120 of the power supply 110. Connected in this way, if any of the power supply 110, the voltmeter 122, and the ammeter 124 detect an out of tolerance condition, the specific condition will be communicated to the PLC CPU module 100 via the PLC input module 102. In the alternative, the four switches associated with the voltmeter 122 and the ammeter 124 can have separate connections to the PLC input module 102.

There are three user inputs to the system control unit 13: a system reset button 130, a pump mode selection switch 132, and a cell power switch 134, all of which are in circuit communication with the system control unit 13. The system reset button 130 is an illuminated momentary push-button switch used to reset many of the electrical components of the system control unit 13 and is in circuit communication with the PLC CPU module 100 via the PLC input module 102. The pump mode selection switch 132 is a three-position switch used to control the mode of the injection pump 17 and is in circuit communication between the PLC output control module 104 and the pump 17. The pump mode selection switch 132 is used to select between OFF (regardless of sensors and attempted control by the PLC CPU module 100), ON (regardless of sensors and attempted control by the PLC CPU module 100), and AUTO (controlled by the PLC CPU module 100) modes for the pump 17. The power switch 134 is a two-position switch used to enable or disable control of the cell by the PLC CPU module 100 and is in circuit communication with the PLC CPU module 100 via the PLC input module 102.

As seen in FIGS. 2a–2c, the electrical components of the system 1 are connected to an external power source 136 via circuit breakers 138a–138k.

Figure 3A:
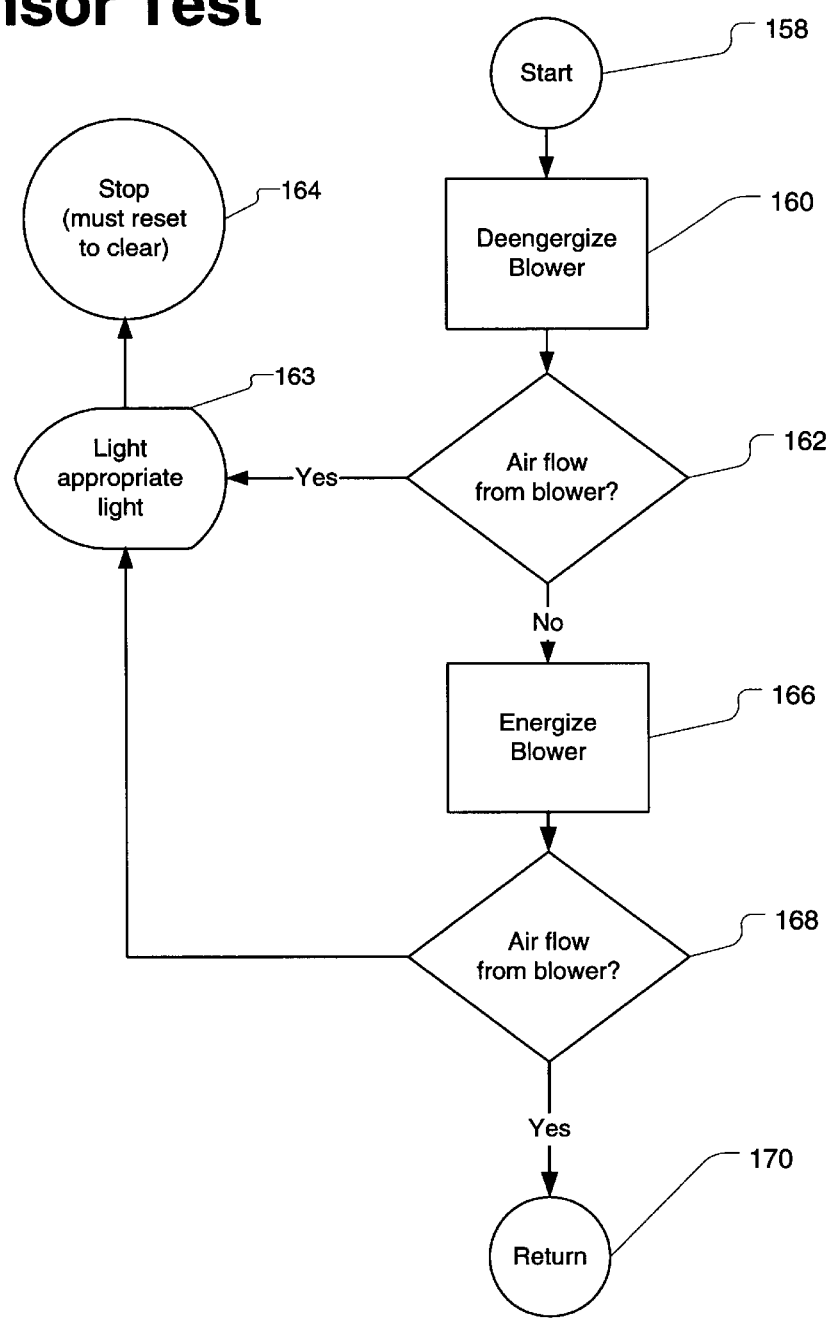
FIGS. 3a–3b are flow charts showing a high-level overview of the various routines executed in the system control unit of FIGS. 2a–2c.
Figure 3B:
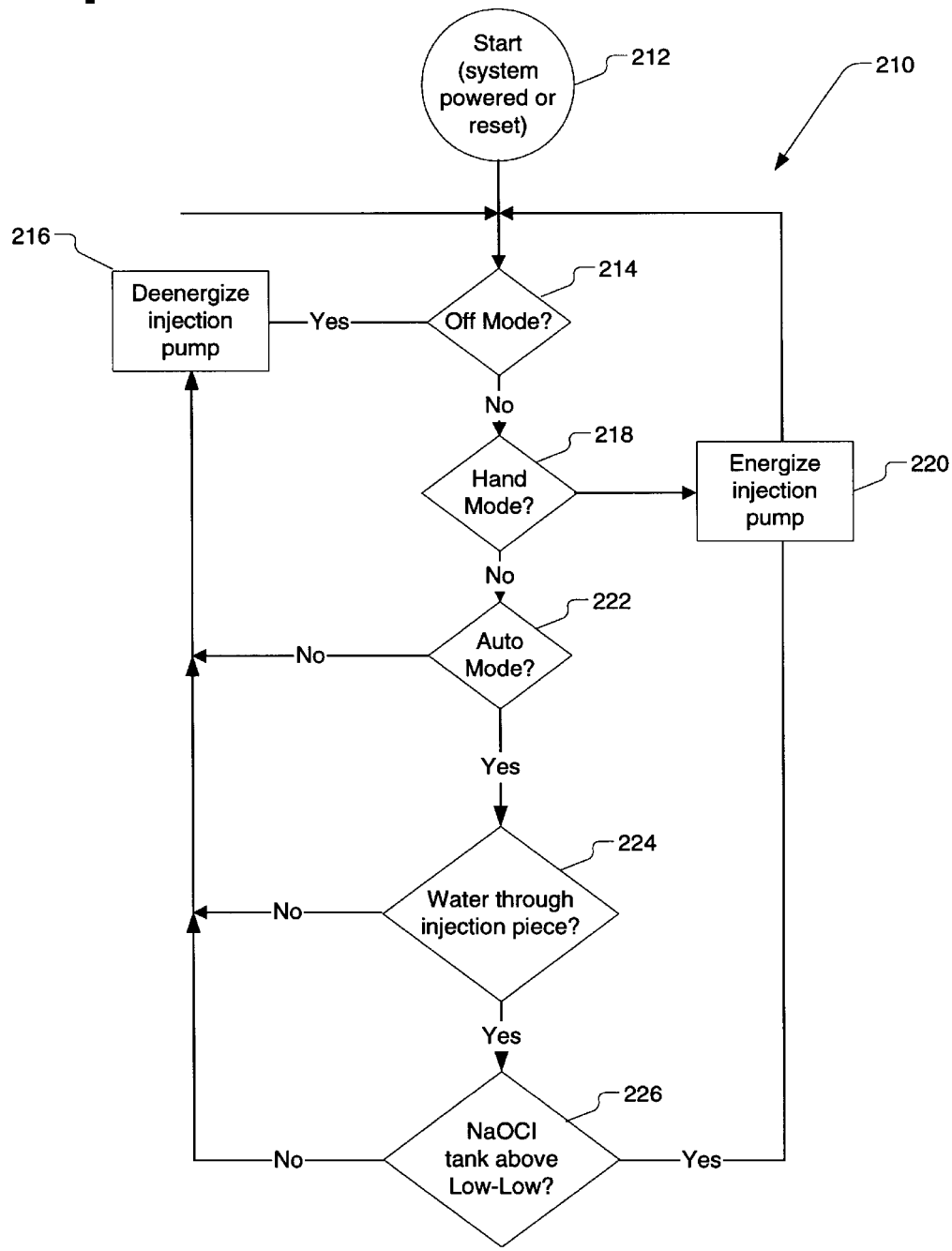

Referring now to FIGS. 3a–3b, flowcharts showing a high-level overview of the routines executing on the PLC CPU module 100 are shown. In general, during normal operation the injection pump 17 is energized when the level of hypochlorite in the hypochlorite storage tank 15 is above the low-low level and is deenergized when the level of hypochlorite in the hypochlorite storage tank 15 is at or below the low-low level. In general hypochlorite is generated (always assuming that a number of conditions are met) until the level of hypochlorite in the hypochlorite storage tank 15 is at or above the high level. Once the level of hypochlorite in the hypochlorite storage tank 15 falls to the low level or below, hypochlorite is generated again. If the level of hypochlorite in the hypochlorite storage tank 15 is above the low level when the system is activated or reset, then hypochlorite is not generated until the level of hypochlorite in the hypochlorite storage tank 15 falls to the low level or below.

Referring now to FIG. 3a, the air flow sensor test routine begins at task 158. The blower 22 is deenergized as the system first turns on or is reset, as indicated at task 160. The PLC CPU module 100 therefore tests whether there is any air flow detected downstream of the blower 22, at task 162. That is, at task 162, the PLC CPU module 100 tests whether the blower flow switch 84 is open (air flow detected) or closed (no air flow detected). On the one hand, if at task 162 sufficient air flow is detected by the blower flow switch 84 with the blower 22 deenergized, then there is a problem and the PLC CPU module 100 at task 163 lights appropriate lamp(s), e.g., the Blower Low Flow lamp 108a. Next, the control routine 150 enters a state, at task 164, in which the electrolytic section 11 will not be energized and in which the system must be reset to exit. On the other hand, if at task 162 the blower flow switch 84 is open (no air flow) while the blower 22 is deenergized, then the test continues by energizing the blower, at task 166.

The PLC CPU module 100 again tests whether there is any air flow detected downstream of the blower 22, at task 168. On the one hand, if at task 168 no air flow is detected by the blower flow switch 84 with the blower 22 energized, then there is a problem and the PLC CPU module 100 at task 163 lights appropriate lamp(s), e.g., the Blower Low Flow lamp 108a. Next, the control routine 150 enters the state at task 164, in which the electrolytic section 11 will not be energized and in which the system must be reset to exit. On the other hand, if at task 168 the blower flow switch 84 is closed (air flow detected) while the blower 22 is energized, then the blower flow switch 84 has passed its test and code execution continues by returning at task 170.

FIG. 3b shows the pump; control routine 210, which executes independently from that of the electrolytic section control routine. This routine starts at task 212 whenever the system 1 is reset, which happens whenever the system 1 is powered up and when the reset button 130 is actuated. The pump control routine tests the pump mode selection switch 132 to determine the mode of the pump. If the pump mode selection switch 132 is in OFF mode, at 214, then the pump is deenergized, at 216. If not, and the pump mode selection switch 132 is in the HAND mode, at 218, then the pump is energized, at 220. if not, and the pump mode selection switch 132 is in the AUTO mode, at 222, then the PLC CPU module 100 tests whether water is being injected through the injection spool, at 224, and whether the hypochlorite level is above low-Low level. If so, then the pump 17 is energized, at 220. if not, then it is deenergized, at 216.

The generalized routines of FIGS. 3a and 3b show generally which tasks are performed and show generally the conditions required for operation of the various devices, While the present invention has been illustrated by the description of embodiments thereof, and while certain aspects of the system have been described in considerable detail, it is not the intention of the applicant to restrict or in any way limit the scope of the appended claims to such detail. Additional advantages and modifications will readily appear to those skilled in the art. For example, the circuitry of the system control unit shown in FIGS. 2a–2c can be replaced by a plurality of relays connected in circuit communication to implement the various tasks shown in FIGS. 3a and 3b and the text accompanying those figures. As another example, instead of being a fixed -current power supply, the power supply can be a controllable-current power supply accepting a control word from the PLC CPU unit 100 to predetermine the current generated thereby. Such a controllable-current power supply might be selectively controlled via that control word such that hypochlorite is generated at various rates depending on the present demand for hypochlorite. Therefore, the invention in its broader aspects is not limited to the specific details, representative apparatus and method, and illustrative examples shown and described. Accordingly, departures may be made from such details without departing from the spirit or scope of the applicant's invention concept.

what is claimed is:

1. In combination with a system for disinfecting water by mixing thereof with hypochlorite accompanied by other gaseous products such as hydrogen, including: means for storing said hypochlorite with the other gaseous products; pump means for inducing flow of the hypochlorite from the storing means under pulsating pressure and means for injecting said flow of the hypochlorite into the water, the improvement residing in separation of the hypochlorite from the other gaseous products within the storing means for removal of the hydrogen therefrom, including: means mixing the other gaseous products discharged from the storing means with gaseous material containing oxygen; and heating band means on the mixing means for inducing reaction between the oxygen and the hydrogen in the other gaseous products to produce water vapor through which the hydrogen is removed.

2. The system as defined in claim 1 including powered electrical circuit means operatively connected to the heating band means for operational control of said mixing means.

3. The system as defined in claim 2, wherein said gaseous material containing the oxygen is air; blower means for inducing inflow of the air into the hypochlorite storing means under control of the powered electrical circuit means; and means for testing said inflow of the air for determining said control of the blower means.

4. The system as defined in claim 1, wherein said gaseous material containing the oxygen is air; blower means for inducing inflow of the air into the hypochlorite storing means.

5. The system as defined in claim 4, including means for electrolytically generating said hypochlorite and the other gaseous products from a brine water solution derived from a source of water and a briner tank within which the water and salt is mixed.

6. The system as defined in claim 1 including means for electrolytically generating said hypochlorite and the other gaseous products from a brine water solution derived from a source of water and a briner tank within which the water and salt is mixed.

7. In a system for disinfecting water in response to treatment thereof with hypochlorite generated by electrolysis producing other gaseous products including gaseous hydrogen, the improvement residing in apparatus for removing the gaseous hydrogen during said treatment of the water, comprising: means for separating said other gaseous products from the hypochlorite; means for mixing the separated gaseous products with gaseous material containing oxygen; band means for heating the separated gaseous products and the gaseous material during said mixing thereof for inducing reactive combining of the gaseous hydrogen and the oxygen therein to produce water; and means for disposing of the water produced by said mixing and heating means to effect said removal of the gaseous hydrogen.

8. The system as defined in claim 7, wherein said band heating means is under control of external bands through which said reactive combining is induced within a temperature range of approximately 100° C. to 400° C.

* * * * *